United States Patent
Kepros et al.

(10) Patent No.: US 7,493,268 B2
(45) Date of Patent: Feb. 17, 2009

(54) METHOD FOR PROCESSING ELECTRONIC REBATES

(75) Inventors: Kevin Peter Kepros, Pine Island, MN (US); Michael Robert Lenz, Rochester, MN (US); Rick William Stuart, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1675 days.

(21) Appl. No.: 09/835,731

(22) Filed: Apr. 16, 2001

(65) Prior Publication Data
US 2002/0152119 A1    Oct. 17, 2002

(51) Int. Cl.
*G06Q 30/00* (2006.01)
(52) U.S. Cl. ............... 705/14; 705/26; 705/27; 235/375; 235/380; 235/382; 235/383
(58) Field of Classification Search ............ 705/14, 705/26, 27
See application file for complete search history.

(56) References Cited

U.S. PATENT DOCUMENTS

| | | | |
|---|---|---|---|
| 4,674,041 A * | 6/1987 | Lemon et al. ............ | 705/14 |
| 5,513,117 A * | 4/1996 | Small ........................ | 700/233 |
| 5,791,991 A | 8/1998 | Small ........................ | 463/41 |
| 5,905,246 A | 5/1999 | Fajkowski ................. | 235/375 |
| 5,950,173 A | 9/1999 | Perkowski ................. | 705/26 |
| 6,009,411 A | 12/1999 | Kepecs ..................... | 705/14 |
| 6,014,634 A | 1/2000 | Scroggie et al. .......... | 705/14 |
| 6,035,280 A | 3/2000 | Christensen .............. | 705/14 |
| 6,067,529 A | 5/2000 | Ray et al. ................. | 705/26 |
| 6,175,823 B1 * | 1/2001 | Van Dusen ............... | 705/26 |
| 6,193,155 B1 * | 2/2001 | Walker et al. ............ | 235/381 |
| 6,332,127 B1 * | 12/2001 | Bandera et al. .......... | 705/14 |
| 6,450,407 B1 * | 9/2002 | Freeman et al. .......... | 235/492 |
| 6,467,686 B1 * | 10/2002 | Guthrie et al. ........... | 235/383 |
| 6,748,365 B1 * | 6/2004 | Quinlan et al. .......... | 705/14 |

OTHER PUBLICATIONS

Amy Doane, "The Shopper's Wallet-More And More Retailers Are Using Rewards Clubs To Keep Customers, Generate Market Research", San Francisco Chronicle: Friday Jul. 31, 1998.*

* cited by examiner

*Primary Examiner*—Jean Janvier
(74) *Attorney, Agent, or Firm*—Patterson & Sheridan, LLP

(57) ABSTRACT

A method for processing electronic rebates is disclosed. In one embodiment, a purchase identifier is linked to a purchase of a product. The purchase identifier is listed on a receipt upon the purchase of the product or contained in an electronic mail message sent to an electronic mail address accessible using a user computer system. Information is then received via a network from a user of the user computer system to complete a rebate claim for the purchased product. The received information is verified to determine whether the purchase identifier was provided. The rebate claim is granted if the received information is verified as correct.

15 Claims, 3 Drawing Sheets

METHOD FOR PROCESSING ELECTRONIC REBATES

BACKGROUND OF THE INVENTION

1. Field of the Invention

The invention relates to computer systems and computer software. More particularly, the invention relates to a method and apparatus for processing electronic rebates.

2. Background of the Related Art

Companies and manufacturers often use promotions to increase sales of its products. One common type of promotion is to provide a rebate to a purchaser of a particular product. Initially, the customer purchases an item or product. To claim the rebate, a customer must complete a rebate form, obtain proof of purchase information, e.g., a receipt and product code, and submit the rebate for processing. The customer waits for the rebate, while the company receives the rebate request, validates the rebate and issues a check to the customer. The customer then cashes the issued check from the company.

Although the rebate claim process enables a company to sell more products and a customer to purchase a product at a cheaper price, there are some disadvantages to this rebate process. For example, the current rebate process often takes a long time, e.g., often eight to twelve weeks, to complete. The customer is also required to obtain the original sales receipt, the product code and complete a rebate form prior to submitting the rebate claim. Moreover, the company must have employees to process and validate the rebates as well as issuing rebate checks. Therefore, a need exists in the art to provide a solution for processing rebates without the disadvantages associated with the current processing of rebates.

SUMMARY OF THE INVENTION

The invention provides a method for processing electronic rebates. In one embodiment, a purchase identifier is linked to a purchase of a product. The purchase identifier is listed on a receipt upon the purchase of the product or contained in an electronic mail message sent to an electronic mail address accessible using a user computer system. Information is then received via a network from a user of the user computer system to complete a rebate claim for the purchased product. The received information is verified to determine whether the purchase identifier was provided. The rebate claim is granted if the received information is verified as correct.

The electronic processing of rebates provides several advantages over the current (manual) processing of rebates. The customer is no longer required to cut the product code, e.g., UPC symbol, from the product, gather the original sales receipt, manually fill a rebate form, and send the contents to the manufacturer or third party used to process rebates. Moreover, the manufacturer does not have to manually verify the rebates submitted from the purchaser of the product. The processing of electronic rebates is potentially much faster than the current processing of rebates.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

Figure 1:
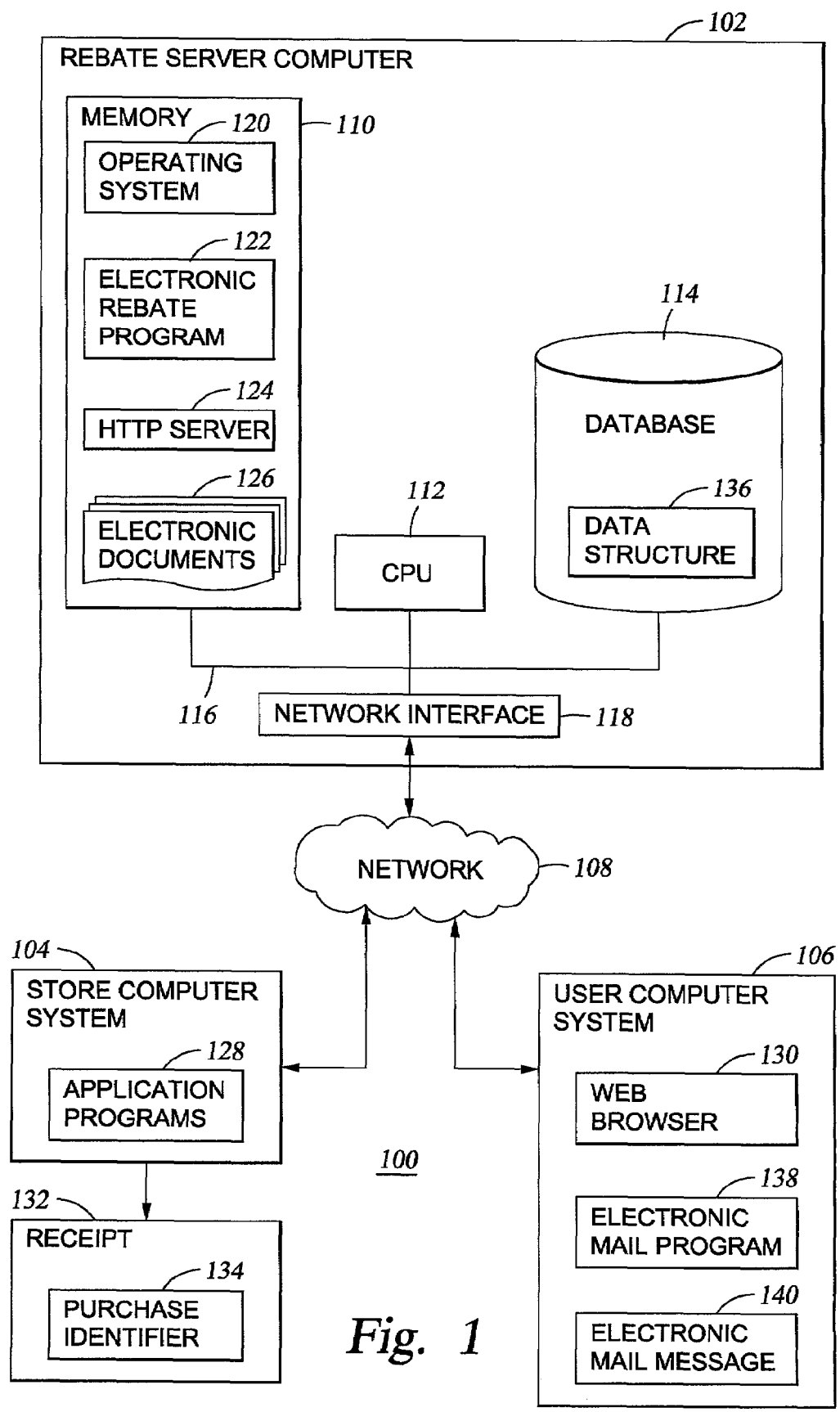
FIG. 1 depicts a block diagram of a computer system to implement the present invention.

FIG. 1 depicts a block diagram of a computer system 100 for processing electronic rebates (e-bates). In one embodiment, the computer system 100 comprises a rebate server computer 102 and store computer system 104 and a user computer system 106. The rebate server computer 102 interacts with the store computer system 104 and the user computer system 106 to process electronic rebates.

One embodiment of the rebate server computer 102 comprises a central processing unit (CPU) 112 that is coupled to a memory 110, a database 114 and a network interface 118 via a bus 116. The memory 110 includes an operating system 120, an electronic rebate program 122, a http (Hypertext Protocol) server 124 and electronic documents 126. The memory 110 may comprise one or a combination of memory devices, including Random Access Memory, nonvolatile or backup memory, (e.g., programmable or Flash memories, read-only memories, and the like). In addition, memory 110 may include memory physically located elsewhere in the server computer system 102, for example, any storage capacity used as virtual memory or stored on a mass storage device or on another computer coupled to the computer system 100 via bus 116.

The CPU 112 is a processor that executes the electronic rebate program 122 to implement electronic rebates. The database 114 may comprise either a permanent or removable direct access storage device (DASD) used to store information used to process electronic rebates. One embodiment of stored information is in the form of a data structure 136. The data structure 136 may contain information about a particular purchase of a product. Such information may include a purchase identifier 134 and other information used to process an electronic rebate claim from a customer. The data structure 136 may also contain information entered from the user in electronically submitting the rebate claim. The network interface 118 enables the server computer 102 to communicate with the store computer system 104 and the user computer system 106 via the network 108. Examples of the network interface 118 include a modem and a network interface card.

The operating system 120 manages the operation of the rebate server computer 102 to process electronic rebates. Examples of the operating system 120 may include IBM OS/400, UNIX, IBM AIX, Microsoft Windows, Windows NT, Linux and the like. The electronic rebate program 122 enables the rebate server computer 102 to electronically process rebates. The electronic processing of rebates provides several advantages over the current (manual) processing of rebates. First, the customer is no longer required to cut the product code, e.g., UPC symbol, from the product, gather the original sales receipt 132, manually fill a rebate form, and send the contents to the manufacturer or third party used to process rebates. Second, the manufacturer does not have to manually verify the rebates submitted from the purchaser of the product. Third, the processing of electronic rebates is potentially much faster than the current processing of rebates. One embodiment to implement the electronic rebate program 122 is further described with respect to FIGS. 2-4.

The http server 124 is a computer program that enables the rebate server computer 102 to process rebate claims from the user computer 106. The electronic documents 126 include web pages that the rebate server computer 102 provides to the user computer system 106. These electronic documents 126 may include web pages used to enable the user to enter information for a rebate claim.

The rebate server computer 102 is coupled to the store computer system 104 via a network 108. The store computer system 104 interacts with the rebate server computer 102 to exchange information on the purchase of the product eligible for rebate. One type of information exchange is a unique purchase identifier 134 used for rebate purposes. The store computer system 104 may print the purchase identifier 134 on a receipt 132 for the purchase or send the purchase identifier 134 in an electronic mail (e-mail) message 140 to an electronic mail address specified by the purchaser of the product, e.g., accessible using the user computer system 106. The purchase identifier 134 may also be in an e-mail message from the rebate server computer 102. To implement these functions, the store computer system 104 executes various application programs 128.

The store computer system 104 may interact via the network 108 with server computer 102 when a customer purchases a product from a store. Information relating to the purchase is exchanged between the server computer 102 and the store computer system 104. More specifically, a purchase identifier 134 is linked to a purchase of the product at a store. The purchase identifier 134 comprises a unique identifier, e.g., a tracking code, to enable the server computer 102 to verify the purchase of the product by the customer. The rebate server computer 102 uses the purchase identifier 134 to subsequently verify the purchase of the product during the processing of the electronic rebate.

In one embodiment, the store computer system 104 creates the purchase identifier 134 upon purchase of the product. The purchase identifier 134 is then sent from the store computer system 104 to the server computer 102 via the network. In another embodiment, the store computer system 104 generates a request for a purchase identifier 134 during the purchase of the product by the customer. The server computer 102 receives the request, generates the purchase identifier 134 and transmits the purchase identifier 134 back to the store computer system 104. The purchase identifier 134 is then printed on the receipt 132 for the product or sent in an e-mail message to an e-mail address specified by the purchaser of the product.

The rebate server computer 102 is also coupled to the user computer system 106 via the network 108. The user computer system 106 may represent any type of computer, computer system or other programmable electronic device, including a client computer, a portable computer, an embedded controller, and the like. In one embodiment, the user computer system 106 is an AS/400 computer available from International Business Machines of Armonk, N.Y. In another embodiment, the user computer system 106 is a personal digital assistant (PDA) device.

The user computer system 106 runs different application programs including a web browser 130 and an electronic mail program 138. The web browser enables a user of the user computer system 106 to access the rebate server computer 102 via the network 108. The electronic mail program 138 enables the user of the user computer system 106 to access, e.g., receive and open, an incoming electronic mail message 140 from either the store computer system 104 or the server computer 102. The electronic mail program 138 also enables the transmission of an electronic mail message 140 from the user computer system 106 and the storage of electronic mail message 140 within a memory in the user computer system 106. The electronic mail message 140 may also contain the purchase identifier 134 (although not shown in FIG. 1).

To process the rebate request, e.g. a rebate claim, from the user computer system 106, the server computer 102 provides a web page upon a request for rebate, e.g., a customer depresses an option or button on the web page or accesses a particular web page. In one embodiment, the customer is only required to enter the purchase identifier 134. In another embodiment, the customer is required to enter at least some of the information listed on a typical rebate form. Examples of such rebate information include an address of the customer, a product code (e.g., UPC label) of the product purchased, a model number of the product, the store where the product was purchased, and the purchase identifier 134.

Once the customer has entered the required rebate information, the rebate server computer 102 determines whether to accept or reject the rebate request. If the request is accepted, the computer 102 issues the request with a check sent to the customer or an electronic funds transfer (EFT). Prior to accepting the request, the rebate server 102 verifies whether the request is valid. To perform this verification, the rebate server 102 determines whether information entered from the customer matches the purchase identifier 134 linked at or upon the purchase of the product. The server 102 may determine whether the user has previously processed the same rebate, returned the product at the store, or processed the rebate over a limit allowed for the product.

The network 108 may comprise any computer or telephone network to transmit the signals between the server computer 102 and the store computer system 104 and/or the user computer system 106. In one embodiment, the network 108 comprises a collection of networks known as the Internet. Individual networks within the Internet may comprise a point to point network, e.g., a plain old telephone system (POTS) network, a broadcast network, e.g., a wireless or RF network, and the like. Transmission of information, e.g., data files and control signals, via the network 108 is performed in accordance with standard transmission formats, e.g., TCP/IP (Transmission Control Protocol/Internet Protocol), ATM (Asynchronous Transfer Mode), SONET (Synchronous Optical Network) and the like. In another embodiment, the network 108 comprises a local area network (LAN).

Different types of network may be used depending on information transferred between the remote server 102 and the store computer system 104 and the user computer system 106. In one embodiment, the transfer of the purchase identifier 134 may occur via a LAN between the server computer 102 and the store computer system 104. The transfer of rebate information between the server computer 102 and the user compute system 106 may occur over the Internet.

Although the illustrative computer system 100 only shows one of each type of computer system, i.e., rebate server computer 102, the store computer system 104 and the user computer system 106, the computer system 100 may include multiple computer systems of a particular type. For example, a single rebate server computer 102 may interact with hundreds of store computer systems 104 and thousands of user computer systems 106.

In general, the routines executed to implement the embodiments of the invention, whether implemented as part of an operating system or a specific application, component, program, object, module or sequence of instructions are in the electronic rebate program 122, or the program 122. The program 122 typically comprises one or more instructions that are resident at various times in various memory and storage devices in the computer system 100. When read and executed by one or more processors 102 in the computer system 100, the program 122 causes that computer system 100 to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing or computer readable media used to actually carry out the distribution. Examples of signal bearing or computer readable media include, but are not limited to, recordable type media such as volatile and nonvolatile memory devices, floppy and other removable disks, hard disk drives, optical disks (e.g., CD-ROM, DVD, and the like), among others.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Figure 2:
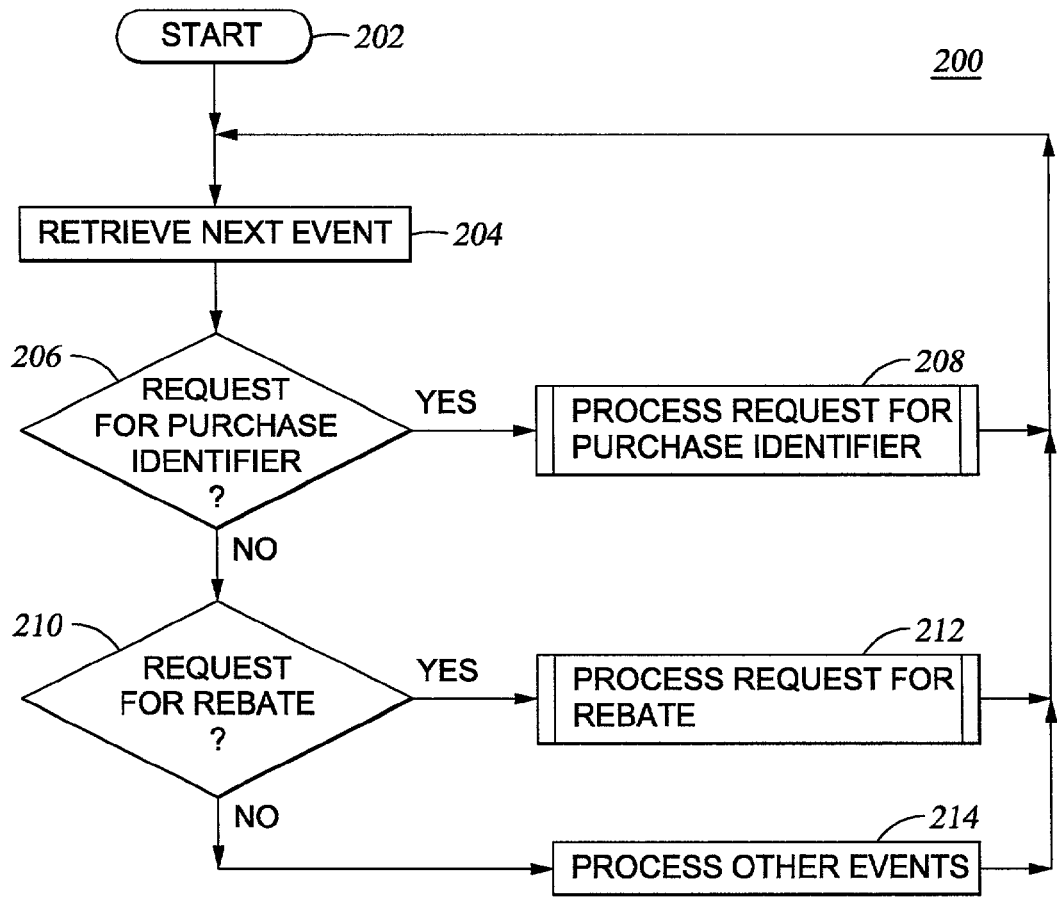
FIG. 2 depicts a flow diagram of a method as embodied in an electronic rebate program.

FIG. 2 depicts a flow diagram of a method 200 as embodied in the electronic rebate program 122. Specifically, the method 200 starts at step 202 and proceeds to step 204 where an event is processed. Such events include commands from the store computer system 104 and the user computer system 106. At step 206, a query determines whether the event is a request for a purchase identifier 134. The store computer system 104 may transmit such a request when a customer purchases a product eligible for rebate. If the event is a request to purchase a product, the method 200 proceeds to process the request at step 208 and to retrieve the next event at step 204. One embodiment of step 208 is further described with respect to FIG. 3.

If the event is not a request to purchase for a purchase identifier 134, the method 200 proceeds to step 210 where a query determines whether the event is a request for a rebate of a previously purchased product. The request for rebate is transmitted from the user computer system 106 after a customer has purchased the product from a store. If the event is a request for rebate, the method 200 proceeds to process the request at step 212 and proceeds to retrieve the next event at step 204. One embodiment of step 212 is further described with respect to FIG. 4.

If the event is not a request for rebate, the method 200 proceeds to step 214 where other events are processed. For example, if a customer returns a product at the store, the event may comprise a request from the store computer system 104 as to whether the customer has already claimed the rebate for a previously purchased product. In this case, step 214 would determine whether the rebate has been claimed for a particular purchase identifier 134 and transmit the result to the store computer system 104. Other events are also contemplated. If the event includes the receipt of the purchase identifier 134 from the store computer system 104, step 214 would store the purchase identifier 134 in the data structure 136 stored in the database 114. If the event includes a request for electronic documents 126, e.g., web pages, from the user computer system 106, step 214 would render or provide the requested web page to the user computer system 106 to enable a customer to proceed with a rebate claim. Step 214 may also include the transmission of an electronic mail message 140 containing the purchase identifier 134 to an electronic mail address accessible using the user computer system 106. After step 214, the method 200 proceeds to retrieve the next event at step 204.

Figure 3:
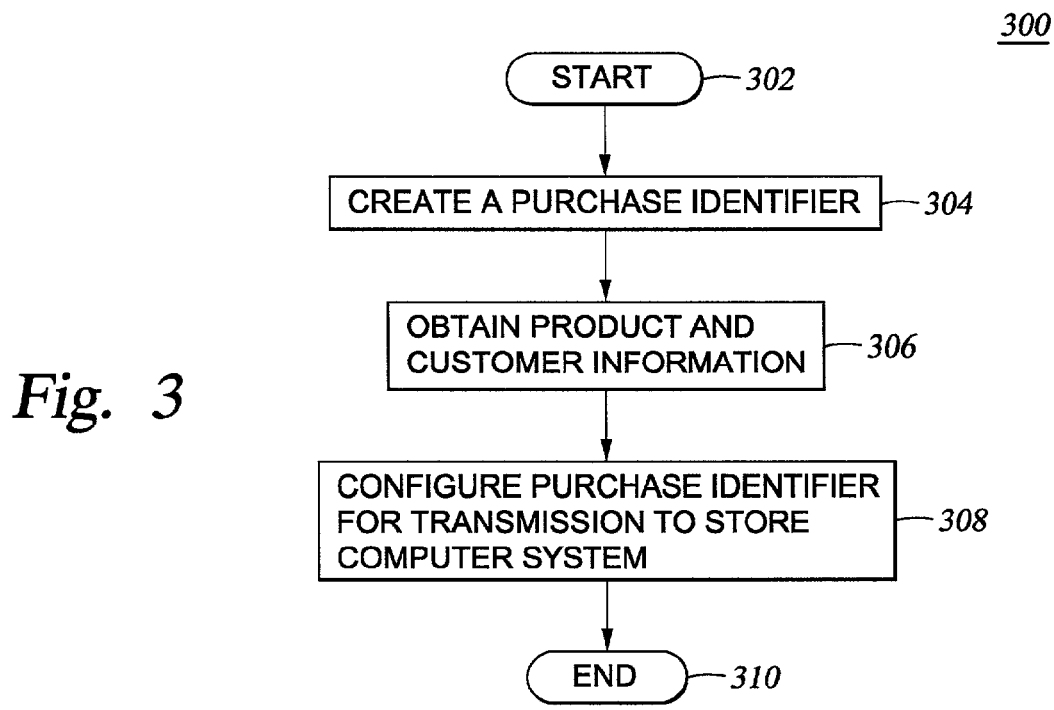
FIG. 3 depicts a flow diagram of a method for processing a request to purchase a product.

FIG. 3 depicts a flow diagram of a method 300 for processing a request to purchase a product. In one embodiment, the request is initiated from the store computer system 104 when a customer purchases a product at a store. The method 300 is embodied as step 208 described above with reference to FIG. 2. Specifically, the method 300 starts at step 302 and proceeds to step 304 where a purchase identifier 134 is created for a particular purchase of a product. At step 306, product information, e.g., UPC identifier and model number of the product, and customer information is obtained for the purchase of the product. The customer identifier may include a customer identifier at the store, a social security number, a previous identifier established with the server computer 102, and the like. The method 300 proceeds to step 308 where the purchase identifier 134 is configured for transmission to the store computer system 104. After step 308, the method 300 proceeds to end at step 310.

Figure 4:
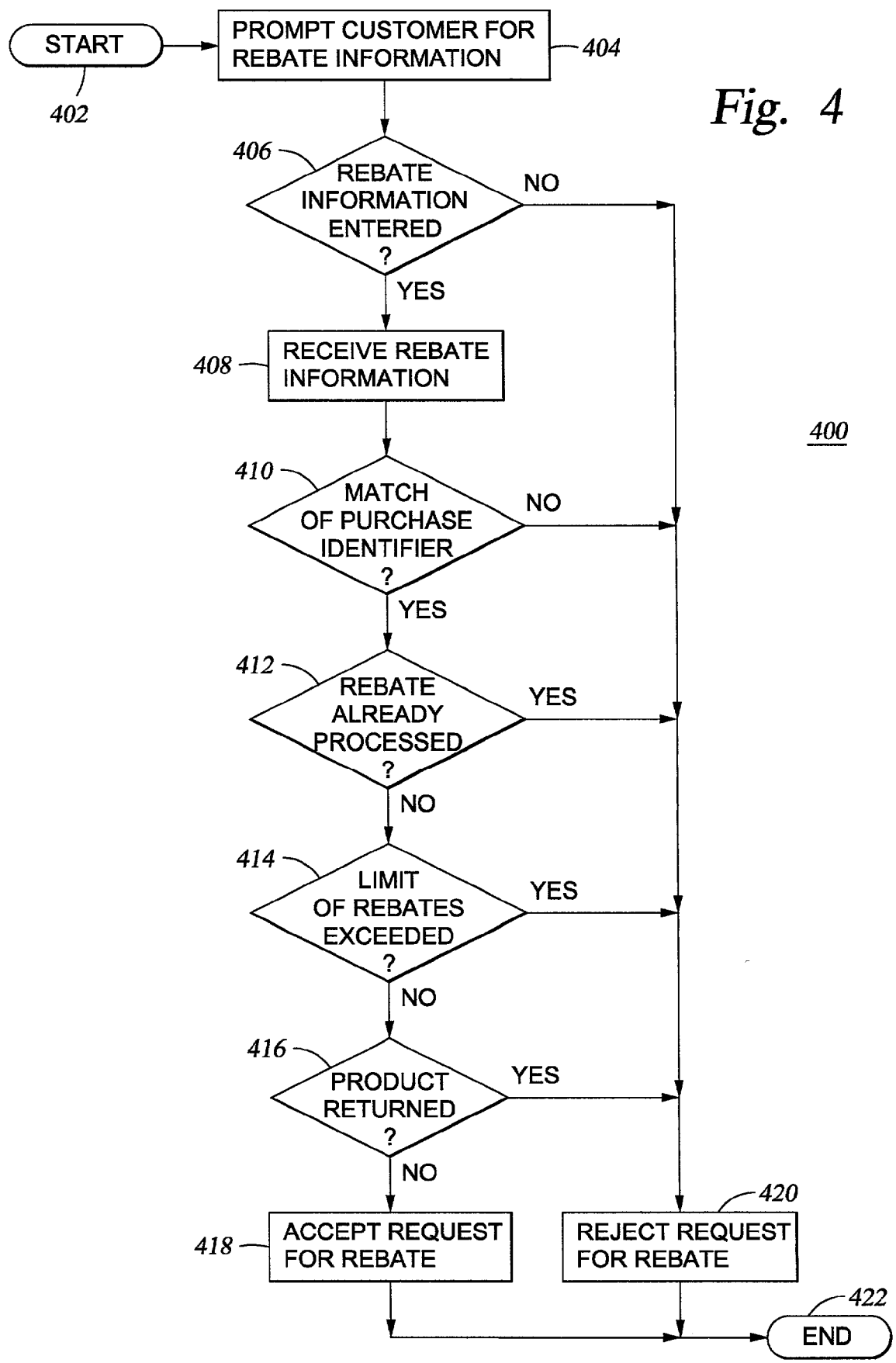
FIG. 4 depicts a flow diagram of a method for processing a request to process a rebate.

FIG. 4 depicts a flow diagram of a method 400 for processing a request to process a rebate or rebate claim for a previously purchased product, i.e., following the completion of a purchase of a product from a store. In one embodiment, the rebate claim or request to process the rebate originates from the user computer system 106. A user may execute the web browser to access a web page provided by the rebate server computer 102 and initiate the request via the web page. The method 400 is embodied as step 212 described above with reference to FIG. 2.

Specifically, the method 400 starts at step 402 and proceeds to step 404 where a prompt for rebate information is provided. In one embodiment, the prompt for information is provided in a web page. At step 406, a query determines whether a user or customer has entered rebate information in response to the prompt at step 404. If the rebate information was not entered, the method 400 proceeds to reject the request for rebate at step 420 and ends at step 422. If the rebate information was entered, the method 400 proceeds to step 408 where rebate information is received from the consumer or user.

The method 400 proceeds to step 410 where a query determines whether the rebate information received at step 408 matches with the product code and customer number received at step 306. Namely, step 410 determines whether the customer has previously purchased the product. If the rebate information does not match the purchase identifier 134, the method 400 proceeds to reject the request for rebate at step 420 and ends at step 422. If the rebate information matches the purchase identifier 134, the method 400 proceeds to step 412 where a query determines whether a request for rebate was already processed. Step 412 prevents multiple rebate requests for the same purchase.

If the rebate was already processed, the method 400 proceeds to reject the request for rebate at step 420 and ends at step 422. If the rebate has yet to be processed, the method 400 proceeds to step 414 where a query determines whether a limit of rebates has been exceeded for a particular customer. For example, the manufacturer may limit the number of rebates to one per household or residence. If the number of rebates exceeds the limit, the method 400 proceeds to reject the request for rebate at step 420 and ends at step 422. If the number of rebates does not exceed the limit, the method 400 proceeds to step 416 where a query determines whether the previously purchased product has been returned. Step 416 prevents a customer from receiving a rebate if a previously purchased product has already been returned.

If the product has been returned, the method 400 proceeds to reject the request for rebate at step 420 and ends at step 422. If the product has not been returned, the method 400 proceeds to step 418 where the rebate claim or request is accepted. Step 418 may also include the issuance of a rebate check or the performance of an electronic funds transfer (EFT). After step 418, the method 400 proceeds to end at step 422.

Although steps 406, 410, 412, 414 and 416 are conditions precedent for issuing a rebate, the method 400 is not limited to these conditions. In another embodiment, the method 400 may test whether the rebate was processed prior to an expiration date. Moreover, the method 400 may require the user answer additional questions prior to issuing the rebate.

Although various embodiments which incorporate the teachings of the present invention have been shown and described in detail herein, those skilled in the art can readily devise many other varied embodiments that still incorporate these teachings.

What is claimed is:

1. A method for processing electronic rebates utilizing a rebate server computer system, the method comprising:
   linking a purchase identifier to a purchase of a product, wherein the linking comprises:
      receiving, by the rebate server computer system via a network, a request for the purchase identifier from a store computer system connected to the network;
      generating, by the rebate server computer system, the purchase identifier for the purchase of the product; and
      transmitting, by the rebate server computer system via the network, the purchase identifier to the store computer system;
   receiving information, via the network, entered by a user of a user computer system to complete a rebate claim for the purchased product;
   verifying the received information to determine whether the received information includes a match to the purchase identifier previously generated by the rebate server computer system; and
   accepting the rebate claim from the user if the received information is verified as a valid rebate claim.

2. The method of claim 1 wherein the purchase identifier is listed on a receipt upon the purchase of the product.

3. The method of claim 1 wherein the purchase identifier is contained in an electronic mail message transmitted from the store computer system to an electronic mail address accessible using the user computer system.

4. The method of claim 1 further comprising:
   transmitting an electronic mail message containing the purchase identifier, to an electronic mail address accessible using the user computer system.

5. The method of claim 1 further comprising:
   providing a web page, via the network, to the user computer system to enable the receipt of information for the rebate claim.

6. The method of claim 1 further comprising:
   verifying whether the rebate claim is a valid request for the rebate.

7. The method of claim 6 wherein the verifying comprises:
   determining whether the rebate claim was previously processed.

8. The method of claim 6 wherein the verifying comprises:
   determining whether a limit of rebates for the product has been exceeded.

9. The method of claim 8 wherein the verifying comprises:
   determining whether the product was previously returned.

10. The method of claim 1 further comprising:
    issuing a check to the user identified on the rebate claim.

11. The method of claim 1 further comprising:
    transferring the rebate electronically to an account of the user identified on the rebate claim.

12. The method of claim 1 wherein the user computer system comprises one of a personal digital assistant (PDA) device and a personal computer.

13. The method of claim 1 wherein the network comprises the internet and the received information is submitted from the user computer using a web browser program.

14. The method of claim 1 wherein the purchase identifier is a unique identifier utilized only for rebate purposes.

15. The method of claim 1 wherein the rebate server computer system is operated by a product manufacturer and the store computer system is operated by a retail store.

* * * * *